(12) United States Patent
Wakeman

(10) Patent No.: US 8,813,605 B2
(45) Date of Patent: Aug. 26, 2014

(54) PENDULUM ABSORBER SNUBBER

(75) Inventor: Russell J. Wakeman, Canton, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 70 days.

(21) Appl. No.: 13/593,611

(22) Filed: Aug. 24, 2012

(65) Prior Publication Data
US 2014/0053680 A1    Feb. 27, 2014

(51) Int. Cl.
*F16C 3/04*    (2006.01)
*F02B 75/06*   (2006.01)

(52) U.S. Cl.
USPC .......................................... 74/604; 123/192.2

(58) Field of Classification Search
CPC ..... F16F 15/14; F16F 15/1407; F16F 15/145; F16F 15/283; F16F 15/286
USPC ........ 74/574, 595, 596, 603, 604, 605, 574.2; 123/192.1, 192.2; 188/272, 297, 301, 188/378; 267/113, 118, 120; 310/51
IPC ........................................................ F16C 3/04
See application file for complete search history.

(56) References Cited

U.S. PATENT DOCUMENTS

| | | | | |
|---|---|---|---|---|
| 2,184,734 | A | * | 12/1939 | Chilton ........................... 74/604 |
| 2,287,866 | A | * | 6/1942 | Criswell ......................... 74/604 |
| 4,862,844 | A | | 9/1989 | Wakeman et al. |
| 5,088,458 | A | | 2/1992 | Wakeman et al. |
| 5,201,287 | A | * | 4/1993 | Blish ........................... 123/48 B |
| 5,216,988 | A | | 6/1993 | Taxon |
| 5,495,924 | A | * | 3/1996 | Shaw et al. .................... 188/378 |
| 5,857,438 | A | * | 1/1999 | Barnard .................... 123/90.16 |
| 6,138,621 | A | | 10/2000 | Albanello et al. |
| 6,474,277 | B1 | | 11/2002 | Vanderpoel et al. |
| 6,688,272 | B2 | | 2/2004 | Brevick et al. |
| 7,509,933 | B2 | * | 3/2009 | Dingle ....................... 123/90.52 |
| 2011/0031058 | A1 | | 2/2011 | Klotz et al. |
| 2013/0098198 | A1 | * | 4/2013 | Geist et al. ...................... 74/604 |

* cited by examiner

*Primary Examiner* — Thomas R Hannon
*Assistant Examiner* — Adam D Rogers
(74) *Attorney, Agent, or Firm* — Ralph E Smith

(57) ABSTRACT

An apparatus for damping vibrations in an internal combustion engine. The apparatus includes a pendulum-type torsional absorber that uses a hydraulic snubber mechanism to limit travel of the pendulum without causing noise or damage to the absorber, crankshaft or other engine components.

18 Claims, 9 Drawing Sheets

PENDULUM ABSORBER SNUBBER

FIELD

The present disclosure relates to an apparatus for absorbing torsional vibrations in an internal combustion engine and, more particularly to a pendulum absorber for a vehicle crankshaft.

BACKGROUND

A crankshaft in a vehicle translates the reciprocating linear motion of an engine's pistons into rotational motion. In so doing, torsional vibrations are generated that emanate through out the vehicle. A four cycle engine with 8, 6, or 4 cylinders tends to produce (respectively) 4, 3 or 2 combustion pulse accelerations per engine revolution. These combustion pulses tend to accelerate the crank and driveline at a frequency that is a multiple of 4, 3 or 2 of the average rotational speed of the engine. Vibrations generated as a result of these pulsations may be uncomfortable for the operator and/or passengers of the vehicle and are unwanted. To reduce the vibrations, the crankshaft may have a frequency tuned dampener that counteracts vibrations at certain frequencies. However, the frequency tuned dampener only operates at one frequency and does not reduce vibrations that occur at other frequencies.

Alternatively, one or more pendulums, with a properly calibrated path of travel, may be attached to the crankshaft at a calibrated distance from its center of rotation. Pendulums, also known as pendulum absorbers or torsional absorbers, act to reduce torsional vibrations that occur at a frequency that is a specific order or multiple of average engine speed. The pendulums are often connected such that they swing (cyclically or non-cyclically) within a predetermined range of motion during the operation of the engine. It is possible for the metallic pendulums to make contact with other portions of the metallic crankshaft, particularly when absorbing severe torsionals. As such, stop pads or other end-of-travel stops are required to reduce noise and to prevent damage to the pendulum or the crankshaft components.

Today's stops, however, are not without their shortcomings. For example, the stops are usually made of non-metallic material, which means that they will eventually become worn out or damaged by the contact with the pendulum. Moreover, contact between the pendulum and stops will result in some undesirable noise, which will worsen over time as the stops begin to wear down. Accordingly, the inventors herein have recognized a need for improvement in the art.

SUMMARY

The present disclosure provides an apparatus for damping vibrations in an internal combustion engine. The apparatus includes a crankshaft comprising a lobe. The lobe comprises a body, a flange coupled to the body, the flange having an opening therein, a pendulum having an opening therein, a pin extending through the pendulum opening and the flange opening to pivotally couple the pendulum to the flange, and a hydraulic snubber assembly for contacting the pendulum.

The present disclosure provides another apparatus for damping vibrations in an internal combustion engine. The apparatus comprises a crankshaft comprising a plurality of lobes, at least one of the lobes acting as a torsional absorber. The at least one lobe comprises a body, a flange coupled to the body, the flange having a first opening, a pendulum coupled to the flange, and a hydraulic snubber assembly for contacting the pendulum. During rotation of the crankshaft, the pendulum follows a predetermined path and the snubber assembly uses hydraulic fluid to prevent the pendulum from hitting the body.

Further areas of applicability of the present disclosure will become apparent from the detailed description, drawings, and claims provided hereinafter. It should be understood that the detailed description, including disclosed embodiments and drawings, are merely exemplary in nature, intended for purposes of illustration only, and are not intended to limit the scope of the invention, its application, or use. Thus, variations that do not depart from the gist of the invention are intended to be within the scope of the invention.

DETAILED DESCRIPTION

Figure 1:
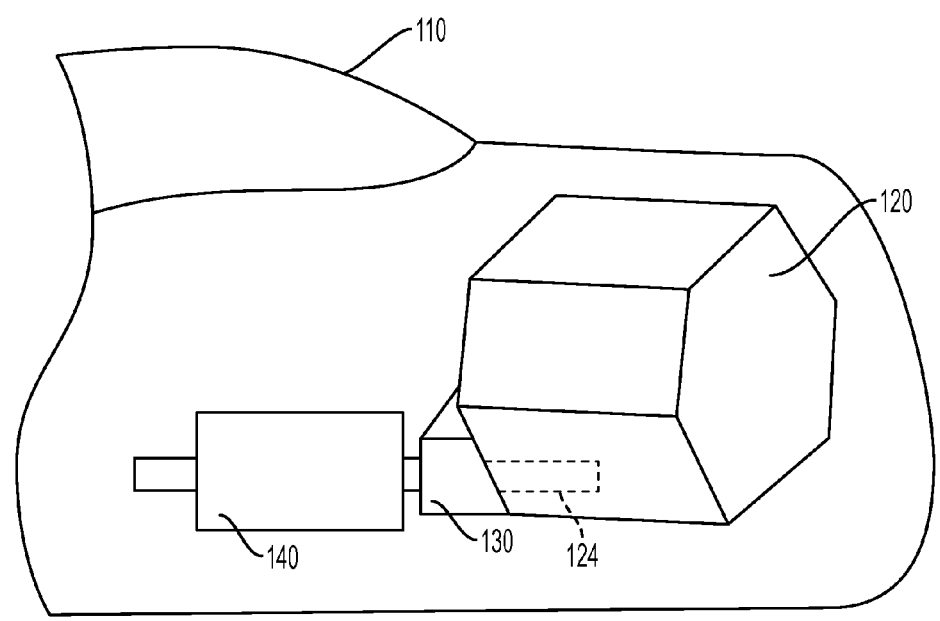
FIG. 1 illustrates a vehicle with an internal combustion engine in accordance with an exemplary embodiment.

FIG. 1 illustrates a vehicle 110 with an internal combustion engine 120, a torque converter 130, and a transmission 140 according to an exemplary embodiment. The engine 120 has a plurality of cylinders (not shown) formed therein. Each cylinder contains a piston (not shown) that reciprocates during operation of the engine 120. The pistons are mechanically coupled to a crankshaft 124 via connecting rods. The crankshaft 124 is mechanically coupled to the torque converter 130. The torque converter 130 transfers torque generated by the engine 120 to the transmission 140 to power the vehicle's 110 wheels. It should be understood that FIG. 1 is a basic diagram of a vehicle. It is desirable to provide an improved pendulum-type torsional absorber that dampens the vibrations of a crankshaft, yet does not introduce noise or cause damage to the absorber or other engine components. Additional parts and other configurations may be implemented without diverging from the scope of this application.

Figure 2:
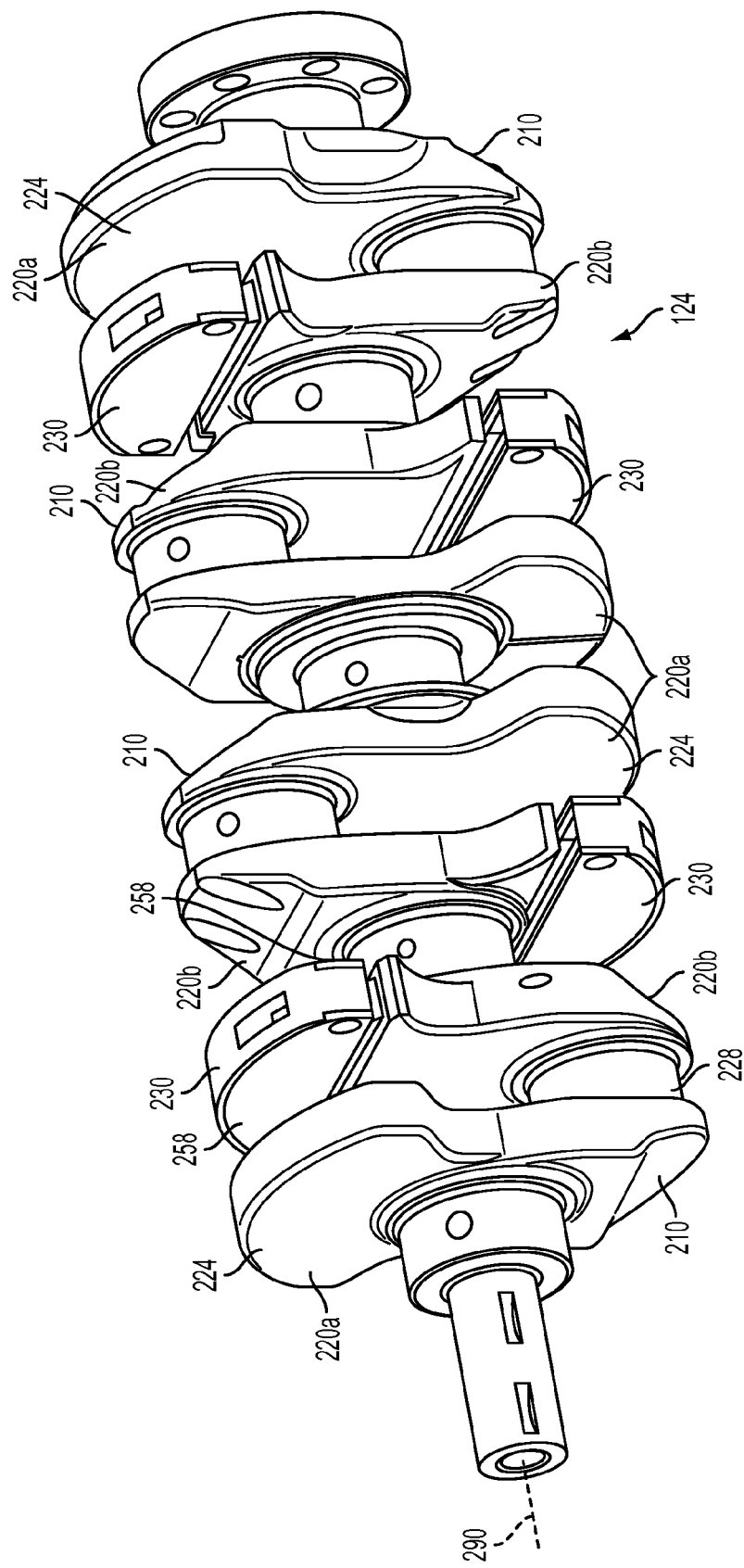
FIG. 2 illustrates a crankshaft in accordance with an exemplary embodiment.

FIG. 2 illustrates an example crankshaft 124 in further detail. The illustrated crankshaft 124 has four interconnected crank nodes 210, but it should be appreciated that the crankshaft 124 may have six or eight interconnected crank nodes 210. Each crank node 210 includes a crank pin 228 and first and second lobes 220a, 220b. Each lobe 220a, 220b has an oval plate-like shape extending in a plane perpendicular to an axis of rotation 290 of the crankshaft 124. The center of each lobe 220a, 220b is aligned near the axis of rotation 290. One end of each lobe 220a, 220b is connected to the crank pin 228. The crank pin 228 connects to a single piston in the engine 120 through a connecting rod (not shown). The crank pin 228 allows a piston to rotate the crankshaft 124 along its axis of rotation 290.

The first lobe 220a of each crank node 210 contains a counterweight 224 on an end opposite the end connected to the crank pin 228. The counterweight 224 balances the motion of the piston and connecting rod assemblies within the engine 120. The counterweights 224 may be integrally formed as part of the lobe 220a or they may be attached to the lobe 220a. Moreover, it should be appreciated that the first lobe 220a may not contain a counterweight 224, if desired.

The second lobe 220b of each crank node 210 contains a torsional absorber 230 on an end opposite the end connected to the crank pin 228. The torsional absorber 230 is designed to reduce the torsional vibrations on the crankshaft 124 that occur from the forces applied to the crankshaft 124 by the engine 120 through the connecting rods. The torsional absorber 230 may also reduce torsional vibrations on the crankshaft 124 that occur when the torque converter 130 is locked to enhance the efficiency of the power transfer between the engine 120 and the transmission 140. Additionally, the torsional absorber 230 may act as a counterweight to balance the motion of the piston and connecting rod assemblies within the engine 120. It should be appreciated that the torsional absorber 230 could follow a circular path (i.e., it is a circular-path pendulum absorber) or a non-circular path (i.e., it is a non-circular-path pendulum absorber). In a desired embodiment, the torsional absorber 230 follows an epicycloidal path such as the torsional absorber disclosed in U.S. patent application Ser. No. 13/277,443, filed on Oct. 20, 2011, which is hereby incorporated by reference in its entirety.

Figure 3:
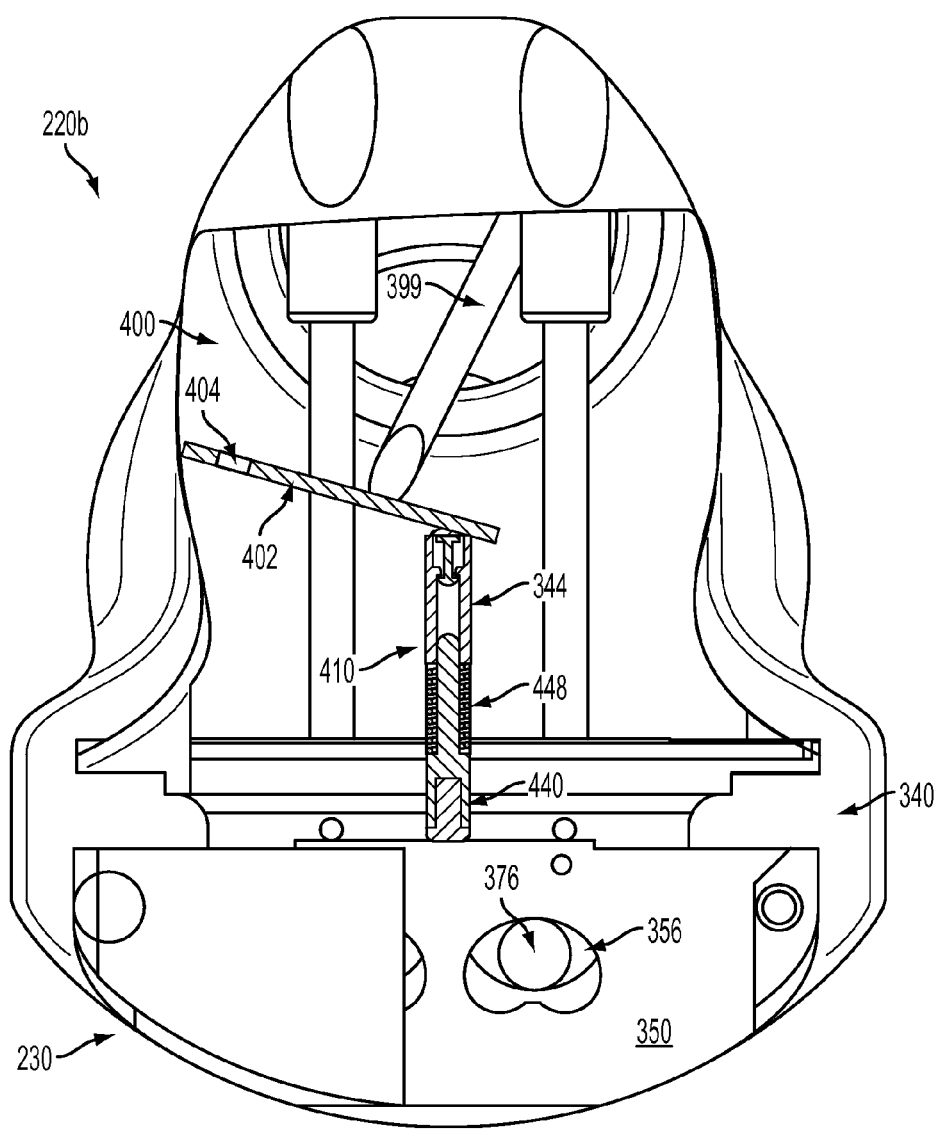
FIG. 3 illustrates a cross-sectional view of a lobe from the crankshaft of FIG. 2 and a partial cross-sectional view of a torsional absorber attached to the lobe in accordance with an exemplary embodiment disclosed herein.
Figure 4:
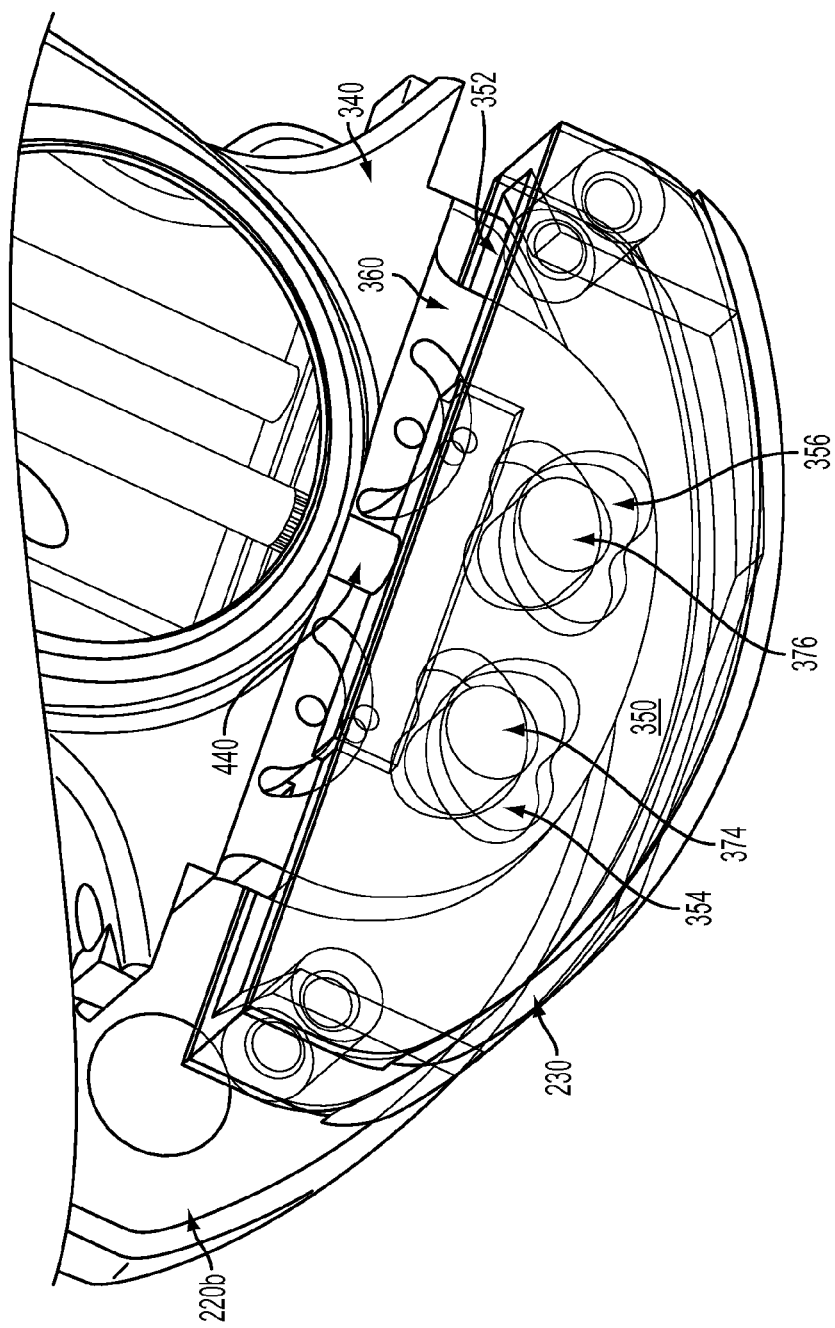
FIG. 4 illustrates a more detailed cross-sectional view of the torsional absorber in accordance with an exemplary embodiment disclosed herein.

FIG. 3 illustrates a cross-sectional view of a second lobe 220b having a torsional absorber snubber assembly 400 constructed in accordance with an exemplary embodiment disclosed herein. FIG. 3 also illustrates a partial cross-sectional view of the torsional absorber 230 attached to the second lobe 220b and contacting the torsional absorber snubber assembly 400. FIG. 4 illustrates a more detailed view of the torsional absorber 230 and its connection to the second lobe 220b. As shown in FIG. 3, the lobe 220b includes a body 340 that has a bore 344 formed therein for housing many of the components of the snubber assembly 400. The body 340 also comprises a lubrication passageway 402 that has been crossed-drilled through the body 340. The lubrication passageway 402 receives oil or other lubrication from a lubrication source 399 used to provide oil/lubrication throughout the crankshaft 124. A plug 404 is used to plug up the passageway 402 to prevent the oil within the snubber assembly 400 from escaping the body 340.

The snubber assembly 400 also includes a plunger assembly 410 having a plunger 440 contacting a pendulum 350 of the torsional absorber 230. A plunger return spring 448 is also shown. As is best seen in FIG. 4, in the illustrated example, the pendulum 350 has a flange opening 352 and a hollow interior. The flange opening 352 and the hollow interior of the pendulum 350 receive a flange 360 portion of the body 340. As is described in more detail in U.S. patent application Ser. No. 13/277,443, the pendulum 350 has two openings 354, 356. The openings 354, 356 are aligned with openings in the flange 360 (not labeled) such that pins 374, 376 may be passed therethrough. The pins 374, 376 pivotally couple the pendulum 350 to the flange 360 in a manner that provides the pendulum 350 with a limited range of free movement. Once the pins 374, 376 are positioned in their respective openings, cover plates 258, as illustrated in FIG. 2, are attached to the sides of the pendulum 350 to secure the pins 374, 376 within the openings. It should be appreciated that, with exception of the contact with the plunger assembly 410, the disclosed embodiments are not limited to the type of pendulum 350 used or how it is otherwise pinned/connected to the body 340 for pendulum-type motion.

As described in more detail in U.S. patent application Ser. No. 13/277,443, the openings 354, 356 within the pendulum 350 and the openings in the flange 360 have corresponding inner surfaces. The inner surfaces all have an identical epicycloidal configuration, but the orientation of the configurations are not identical. That is, the inner surfaces of the openings of the flange 360 are rotated 180 degrees with respect to the inner surfaces of the openings 354, 356 of the pendulum 350. It should be appreciated that inner surfaces having an epicycloidal configuration is merely one example of the surfaces that can be used in the disclosed embodiments and that the embodiments can have circular or other types of inner surfaces.

When the crankshaft 124 is rotating, centripetal force causes the pendulum 350 to extend away from the axis of rotation 290 of the crankshaft 124. When this happens, the pins 374, 376 engage the inner surfaces. As the pendulum 350 moves, the first pin 374 rolls along the inner surface of the first opening 354 of the pendulum 350 and the inner surface of first opening of the flange 360 and the second pin 376 rolls along the inner surface of the second opening 356 of the pendulum 350 and the inner surface of the second opening of the flange 360. The rolling of the pins 374, 376 along the respective inner surfaces causes the pendulum 350 to follow a precise path determined by the inner surfaces. As a result, the pendulum 350 can be forced to establish a resonant harmonic motion that corresponds to and opposes vibrations of numerous frequencies generated by the engine 120 or torque converter 130. The opposing harmonic motion of the pendulum 350 reduces the vibrations transferred throughout the vehicle 110.

As mentioned above, it is possible for the pendulum 350 to make contact with other portions of the crankshaft such as the body 340 of the second lobe 220b, particularly when absorbing severe torsionals. As such, the snubber assembly 400 will be used as an end-of-travel stop to prevent unwanted contact between the pendulum 350 and the body 340 (or other portion of the crankshaft 124). As will be discussed below in more detail, the snubber assembly 400 uses hydraulics to stop (i.e., snub out) the swinging motion of the pendulum 350 such that there is no contact with the body 340 or other traditional end-of-travel stops that could wear out or become noisy when contacted with the pendulum 350.

Figure 5:
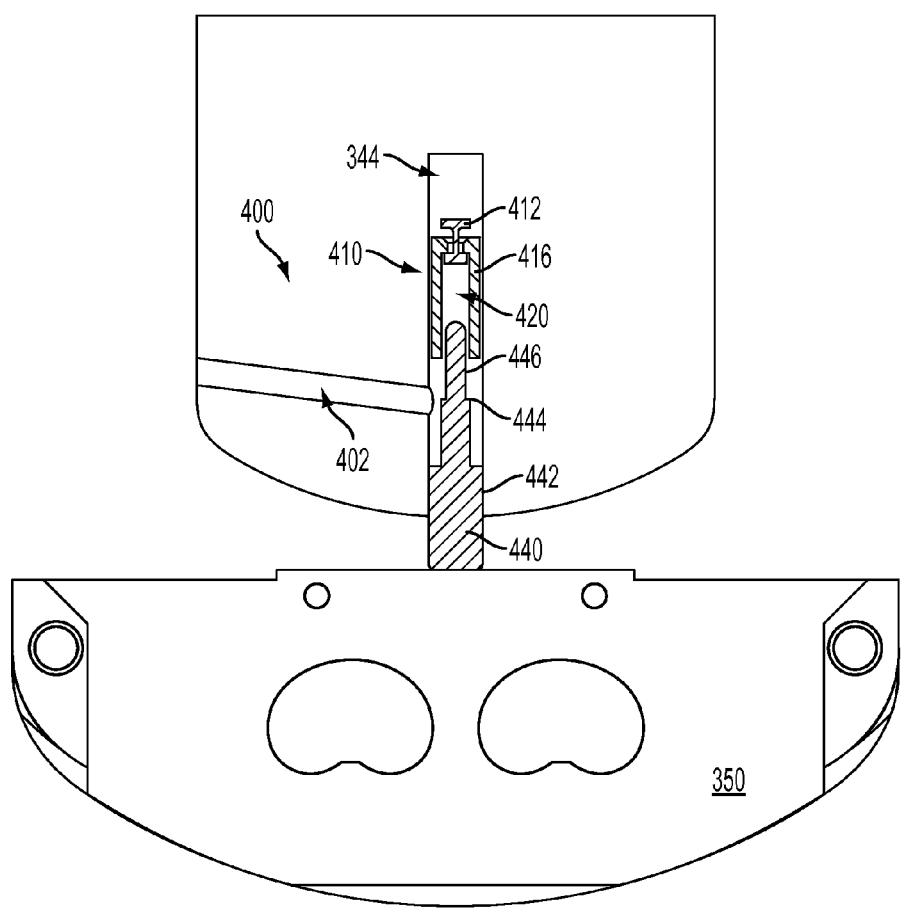
FIG. 5 illustrates a more detailed cross-sectional view of the lobe and torsional absorber illustrated in FIGS. 3 and 4.

FIG. 5 illustrates additional details of the snubber assembly 400, particularly the plunger assembly 410 residing within the bore 344 of the lobe body 340. Bore 344 will be referred to herein as the plunger bore 344 since it houses the plunger assembly 410. The plunger assembly 410 comprises a plunger 440 whose stem has three portions of varying cross-sectional widths: a contacting portion 442 for contacting the pendulum 350, a closing ramp portion 444 and a plunger flats portion 446. As will be described below in more detail, the flats portion 446 of the plunger assembly 410 slides within a plunger sleeve 416 that is press fit into the plunger bore 344. Although not shown, the plunger sleeve 416 may be a six sided/hexagon prism or have any cross-sectional shape (e.g., square, triangular, fluted) that leaves empty space between the circular drilling of the bore 344 and the body of the pressed-in sleeve 416 for oil flow, the significance of which is discussed below in more detail.

A poppet-type check valve 412 is located at an end of the sleeve 416 opposite the end that receives the plunger flats portion 446. The space within the sleeve 416 that is between the check valve 412 and the plunger flats portion 446 defines a snubbing chamber 420 that will house the oil/lubrication received from the lubrication passageway 402. As will be discussed below, the check valve 412 will allow oil/lubrication to flow in only one direction through the valve. The check valve 412 can be any conventional check valve suitable for the operations discussed below and is not limited to a poppet-type valve. Although not shown, the check valve 412 has a spring that helps position the poppet to allow oil flow in one direction, but not in a second, opposite direction.

Figure 6:
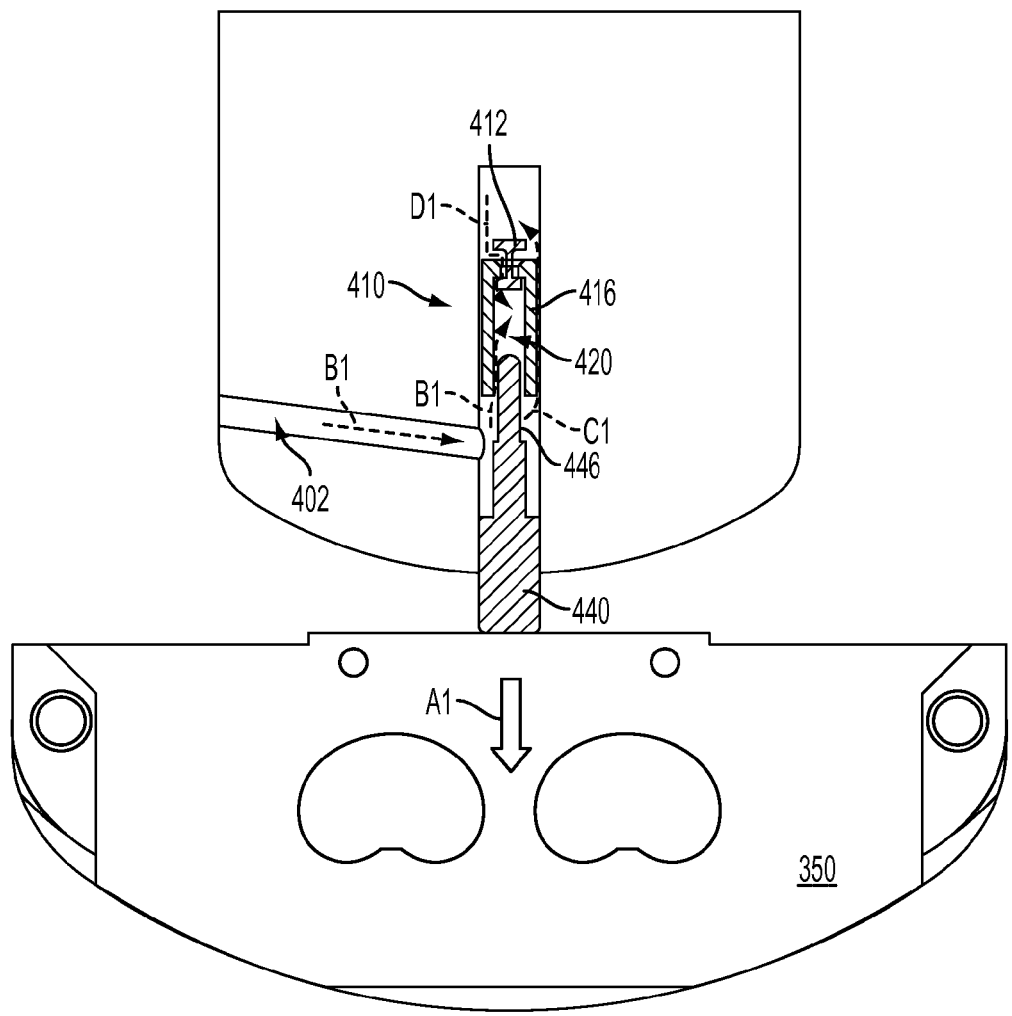
FIGS. 6-9 illustrate the FIG. 5 lobe and torsional absorber during crankshaft operation in accordance with principles disclosed herein.

FIG. 6 illustrates the normal torsional absorber operation with the plunger 440 moving outwardly from the body 340 (shown by arrow A1). As mentioned above, in the illustrated example, the crankshaft 124 is rotating, centripetal force causes the pendulum 350 and the plunger 440 to extend away from the axis of rotation 290 of the crankshaft 124. With the plunger 440 moving outwardly (Arrow A1), oil flows from the lubrication passageway 402 and into the plunger bore 344 (Arrows B1). Oil flows into the snubber chamber 420 through the plunger flats portion 446 and through the hex flats of the plunger sleeve 416 (Arrow C1) to open the check valve 412, which allows oil to flow through the check valve 412 (Arrow D1). This oil flow creates only a limited amount of viscous drag. Outward force is created on the pendulum 350 due to the oil pressure, centripetal force and the return spring (not shown in FIG. 6). In this configuration, the pendulum 350 is free to react to torsionals (as described above).

Figure 7:
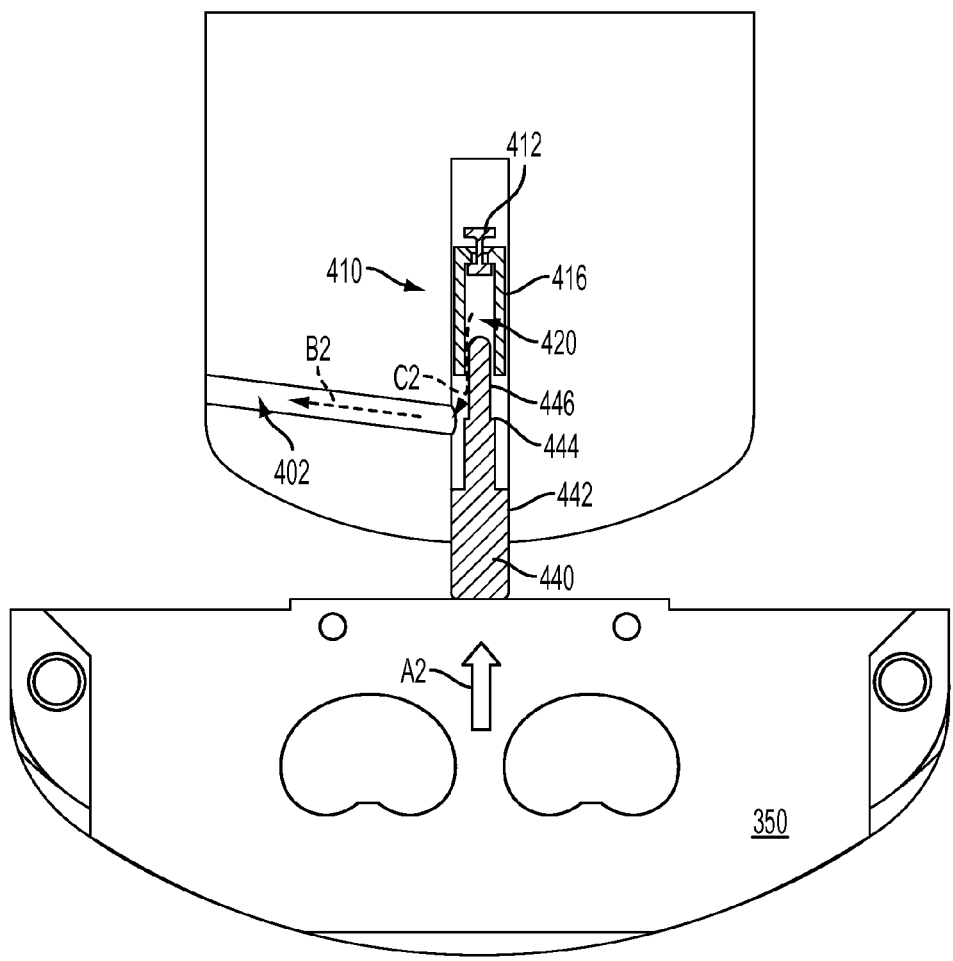

FIG. 7 illustrates the normal torsional absorber operation with the plunger 440 moving inwardly towards the body 340 (shown by arrow A2) as the pendulum 350 moves along its path. With this motion, oil flows through the plunger flats 446 and out of the snubbing chamber (Arrow C2). The oil flows out of the bore 344, through the passageway 402 (Arrow A2) and back to the lubrication source. The check valve 412 closes. As in the prior configuration, the oil flow creates only a limited amount of viscous drag and force is created on the pendulum 350 due to the oil pressure, centripetal force, viscous forces and the return spring (not shown in FIG. 7). The pendulum 350 is still free to react to torsionals.

Figure 8:
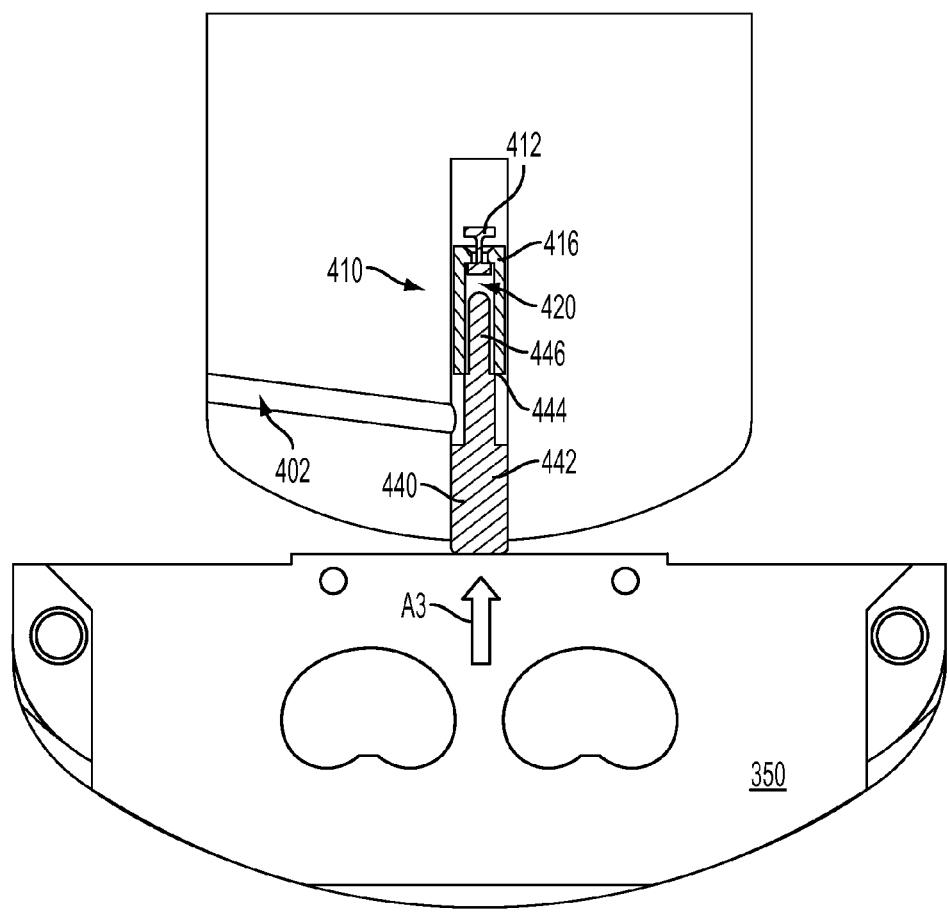

FIG. 8 illustrates a snubbing operation in accordance with the disclosed principles as the plunger 440 continues moving inwardly towards the body 340 (shown by arrow A3). At this point, the entire plunger flats portion 446 is within the sleeve and the closing ramp portion 444 moves into the sleeve 416 to close off the flats and the sleeve 416. The check valve 412 is still closed. As such, oil is trapped within the snubbing chamber 420 and effectively becomes a very high rate hydraulic spring (i.e., the bulk modulus of the trapped oil is compressed by the plunger stem). Due to the trapped oil (i.e., hydraulic spring), the pendulum 350 will be stopped before making contact with the body 340 or other portion of the second lobe 220b. Since there is no contact between the pendulum 350 and the body 340, there will be no noise and no components that can wear down over time. Moreover, by using a hydraulic technique, the components within the snubber assembly 400 will not make noise or wear down either; the ramp portion 444 does not make contact with the sleeve.

Figure 9:
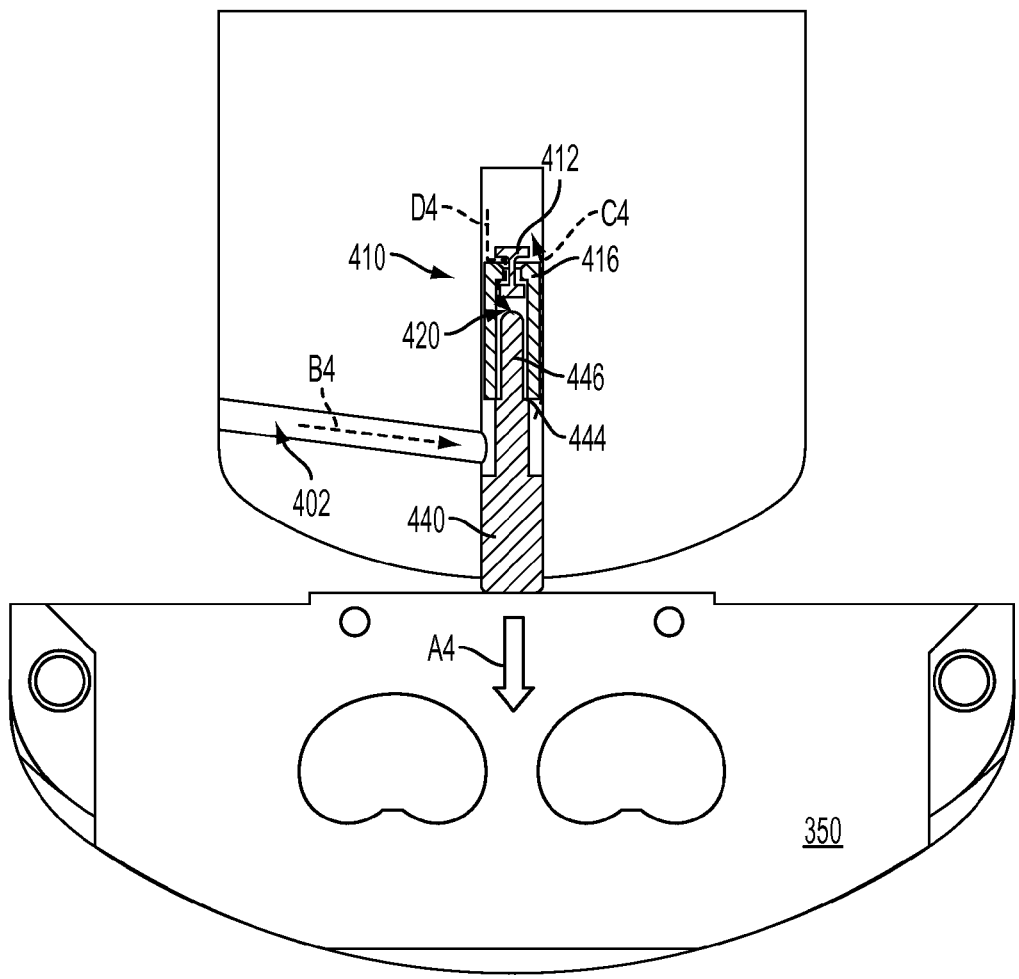

FIG. 9 illustrates a post-snubbing operation in accordance with the disclosed principles as the plunger 440 begins to move outwardly away from the body 340 (shown by arrow A4). The plunger flats are still closed as the plunger 440 begins to move outwardly and the closing ramp portion 444 is still inside the sleeve 416. The check valve 412, however, will open and oil will flow into the snubbing chamber 420 (Arrows B4, C4, D4), relieving the snubbing force. Normal torsional absorber operation (FIG. 7) will begin again.

The hydraulic snubbing operation and assembly disclosed herein has several advantages over traditional pendulum absorber stopping mechanisms. For example, the hydraulic snubbing operation can have variable rates of force with the travel of the pendulum. As mentioned previously, the hydraulic design provides for a long life since fluid is used as the stopping mechanism. Moreover, the hydraulic snubber operation can be used to apply constant small forces to the pendulum 350 to take up clearances in the moving parts and to reduce rattling noise during operation of the engine.

What is claimed is:

1. An apparatus for damping vibrations in an internal combustion engine, the apparatus comprising:
   a crankshaft comprising a lobe, the lobe comprising:
      a body having a bore therein;
      a flange coupled to the body, the flange having an opening therein;
      a pendulum having an opening therein;
      a pin extending through the pendulum opening and the flange opening to pivotally couple the pendulum to the flange; and
      a hydraulic snubber assembly within the bore of the body and contacting the pendulum.

2. The apparatus of claim 1, wherein the hydraulic snubber assembly contacts the pendulum via a plunger assembly.

3. The apparatus of claim 1, wherein the pendulum opening has an epicycloidal configuration and the flange opening causes the pendulum to follow an epicycloidal path when the crankshaft rotates.

4. An apparatus for damping vibrations in an internal combustion engine, the apparatus comprising:
   a crankshaft comprising a plurality of lobes, at least one of the lobes acting as a torsional absorber, the at least one lobe comprising:
      a body having a bore therein;
      a flange coupled to the body, the flange having a first opening;
      a pendulum coupled to the flange; and
      a hydraulic snubber assembly within the bore of the body and contacting the pendulum,
      wherein during rotation of the crankshaft, the pendulum follows a predetermined path and the hydraulic snubber assembly uses hydraulic fluid to prevent the pendulum from hitting the body.

5. The apparatus of claim 4, wherein more than one of the plurality of lobes act as a torsional absorber.

6. The apparatus of claim 4, wherein the hydraulic snubber assembly contacts the pendulum via a plunger assembly.

7. The apparatus of claim 4, wherein the pendulum opening has an epicycloidal configuration and the flange opening causes the pendulum to follow an epicycloidal path when the crankshaft rotates.

8. The apparatus of claim 4, wherein the hydraulic fluid is oil.

9. An apparatus for damping vibrations in an internal combustion engine, the apparatus comprising:
   a crankshaft comprising a lobe, the lobe comprising:
      a body;
      a flange coupled to the body, the flange having an opening therein;
      a pendulum having an opening therein;
      a pin extending through the pendulum opening and the flange opening to pivotally couple the pendulum to the flange; and
   a hydraulic snubber assembly contacting the pendulum, wherein the hydraulic snubber assembly includes a plunger assembly, the plunger assembly comprising:
      a sleeve within a bore of the body, the sleeve having a first open end and a second open end;
      a valve provided at the first open end of the sleeve; and a plunger having a shaft portion at one end and a second end contacting the pendulum, the shaft portion being slidable within the second open end of the sleeve.

10. The apparatus of claim 9, further comprising a lubrication passageway communicating with the bore, and wherein the shaft portion, the valve and walls of the sleeve define a snubber chamber that receives lubrication from the passageway.

11. The apparatus of claim 9, further comprising a lubrication passageway communicating with the bore, the shaft portion comprising a flats portion sized to fit within the sleeve and a ramp portion configured to close the second open end of the sleeve, wherein:

the flats portion, the valve and walls of the sleeve define a snubber chamber that receives lubrication from the passageway, whereby the lubrication fills the chamber when the pendulum moves in a first direction away from the body, and the lubrication within the chamber acts on the flats portion to prevent the pendulum from hitting the body when the pendulum moves in a second direction towards the body.

12. The apparatus of claim 11, wherein the valve is a poppet-type valve that allows the lubrication to enter the chamber in one direction and not allow the lubrication to exit the chamber in a second direction.

13. The apparatus of claim 11, wherein the lubrication is received in the passageway from a lubrication source used to lubricate the crankshaft when the pendulum moves in the first direction and at least a portion of the lubrication exits the chamber through the passageway when the pendulum moves in the second direction.

14. An apparatus for damping vibrations in an internal combustion engine, the apparatus comprising:

a crankshaft comprising a plurality of lobes, at least one of the lobes acting as a torsional absorber, the at least one lobe comprising:
 a body;
 a flange coupled to the body, the flange having a first opening;
 a pendulum coupled to the flange; and
 a hydraulic snubber assembly contacting the pendulum,
wherein during rotation of the crankshaft, the pendulum follows a predetermined path and the hydraulic snubber assembly uses hydraulic fluid to prevent the pendulum from hitting the body,
wherein the hydraulic snubber assembly includes a plunger assembly, the plunger assembly comprising:
 a sleeve formed within a bore of the body, the sleeve having a first open end and a second open end;
 a valve provided at the first open end of the sleeve; and
 a plunger having a shaft portion at one end and a second end contacting the pendulum, the shaft portion being slidable within the second open end of the sleeve.

15. The apparatus of claim 14, further comprising a lubrication passageway communicating with the bore, and wherein the shaft portion, the valve and walls of the sleeve define a snubber chamber that receives the hydraulic fluid from the lubrication passageway.

16. The apparatus of claim 14, further comprising a lubrication passageway communicating with the bore, the shaft portion comprising a flats portion sized to fit within the sleeve and a ramp portion configured to close the second open end of the sleeve, wherein:

the flats portion, the valve and walls of the sleeve define a snubber chamber that receives the hydraulic fluid from the lubrication passageway, whereby the hydraulic fluid fills the chamber when the pendulum moves in a first direction away from the body, and the hydraulic fluid within the chamber acts on the plunger flats portion to prevent the pendulum from hitting the body when the pendulum moves in a second direction towards the body.

17. The apparatus of claim 14, wherein the valve is a poppet-type valve that allows the hydraulic fluid to enter the chamber in one direction and not allow the hydraulic fluid to exit the chamber in a second direction.

18. The apparatus of claim 14, wherein the hydraulic fluid is received in the passageway from a lubrication source used to lubricate the crankshaft when the pendulum moves in a first direction and at least a portion of the hydraulic fluid exits the chamber through the passageway when the pendulum moves in a second direction.

* * * * *